US009039010B2

(12) United States Patent
Umi et al.

(10) Patent No.: US 9,039,010 B2
(45) Date of Patent: *May 26, 2015

(54) PAPER CONVEYING APPARATUS, JAM DETECTION METHOD, AND COMPUTER-READABLE, NON-TRANSITORY MEDIUM

(71) Applicant: PFU LIMITED, Kahoku-shi, Ishikawa (JP)

(72) Inventors: Takayuki Umi, Kahoku (JP); Masanobu Hongo, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/962,741

(22) Filed: Aug. 8, 2013

(65) Prior Publication Data

US 2014/0054850 A1 Feb. 27, 2014

(30) Foreign Application Priority Data

Aug. 24, 2012 (JP) ................. 2012-185358

(51) Int. Cl.
*B65H 7/02* (2006.01)
*B65H 5/00* (2006.01)
(Continued)

(52) U.S. Cl.
CPC ............ *B65H 5/00* (2013.01); *B65H 2557/112* (2013.01); *B65H 3/063* (2013.01);
(Continued)

(58) Field of Classification Search
CPC ..................... B65H 2511/528; B65H 2515/82; B65H 2557/112
USPC ......................................... 271/265.02, 265.03
See application file for complete search history.

(56) References Cited

U.S. PATENT DOCUMENTS 4,022,460 A * 5/1977 Pritchett .................. 271/258.03
6,314,054 B1 11/2001 Priebsch
(Continued)

FOREIGN PATENT DOCUMENTS

JP 57-169767 10/1982
JP 60-112547 6/1985
(Continued)

OTHER PUBLICATIONS

Office action mailed Jul. 9, 2013 for JP 2012-185273 including English translation, 7pp.

(Continued)

*Primary Examiner* — Michael McCullough
*Assistant Examiner* — Howard Sanders
(74) *Attorney, Agent, or Firm* — Christie, Parker & Hale LLP

(57) ABSTRACT

There are provided a paper conveying apparatus, a jam detection method and a computer-readable, non-transitory medium that can suppress erroneous detection of an occurrence of a jam by sound due to the sound generated along with conveyance of a paper. The paper conveying apparatus includes a first sound signal generator for generating a first sound signal corresponding to a sound generated by a paper during conveyance, at least a part of the first sound signal generator is provided at one end of a conveyance path of the paper, a second sound signal generator for generating a second sound signal corresponding to the sound, at least a part of the second sound signal generator is provided at the other end of the conveyance path, and a sound jam detector for determining whether a jam has occurred based on a difference of the first sound signal and the second sound signal.

6 Claims, 15 Drawing Sheets

(51) Int. Cl.
*B65H 3/06* (2006.01)
*B65H 3/52* (2006.01)
*B65H 5/06* (2006.01)
*B65H 7/06* (2006.01)
*B65H 7/12* (2006.01)
*H04N 1/00* (2006.01)

(52) U.S. Cl.
CPC .......... *B65H 3/0653* (2013.01); *B65H 3/5284* (2013.01); *B65H 5/062* (2013.01); *B65H 7/06* (2013.01); *B65H 7/125* (2013.01); *H04N 1/00326* (2013.01); *B65H 2402/46* (2013.01); *B65H 2404/6111* (2013.01); *B65H 2511/242* (2013.01); *B65H 2511/522* (2013.01); *B65H 2511/524* (2013.01); *B65H 2511/528* (2013.01); *B65H 2513/511* (2013.01); *B65H 2515/82* (2013.01); *B65H 2553/30* (2013.01); *B65H 2553/82* (2013.01); *B65H 2553/822* (2013.01); *B65H 2557/23* (2013.01); *B65H 2557/242* (2013.01); *B65H 2557/31* (2013.01); *B65H 2701/1311* (2013.01); *B65H 2701/1313* (2013.01); *B65H 2801/39* (2013.01)

(56) References Cited

U.S. PATENT DOCUMENTS

| | | | |
|---|---|---|---|
| 7,934,722 | B2 | 5/2011 | Namikawa |
| 8,567,777 | B2 | 10/2013 | Syracuse et al. |
| 8,585,050 | B2 | 11/2013 | Syracuse et al. |
| 8,657,285 | B2 | 2/2014 | Matsuoka et al. |
| 8,827,266 | B2 * | 9/2014 | Umi et al. ................. 271/258.01 |
| 2003/0006550 | A1 | 1/2003 | Chujo et al. |
| 2005/0269759 | A1 | 12/2005 | Sano et al. |
| 2006/0022400 | A1 | 2/2006 | Kawasaki et al. |
| 2007/0070456 | A1 | 3/2007 | Nishimura |
| 2008/0224390 | A1 | 9/2008 | Ma et al. |
| 2009/0022536 | A1 * | 1/2009 | Takeshita et al. ............. 400/617 |
| 2009/0190939 | A1 | 7/2009 | Satoh et al. |
| 2010/0272460 | A1 | 10/2010 | Zona et al. |
| 2011/0238423 | A1 | 9/2011 | Schaertel et al. |
| 2012/0235929 | A1 | 9/2012 | Hongo et al. |
| 2013/0093136 | A1 | 4/2013 | Sakharshete et al. |
| 2013/0140757 | A1 | 6/2013 | Phinney et al. |
| 2013/0140766 | A1 | 6/2013 | Syracuse et al. |
| 2014/0054841 | A1 | 2/2014 | Morikawa et al. |
| 2014/0054849 | A1 | 2/2014 | Morikawa et al. |
| 2014/0054851 | A1 | 2/2014 | Morkiawa et al. |
| 2014/0054852 | A1 | 2/2014 | Hongo et al. |
| 2014/0061995 | A1 | 3/2014 | Shimazu |
| 2014/0062008 | A1 | 3/2014 | Hongo et al. |
| 2014/0062009 | A1 | 3/2014 | Hongo et al. |
| 2014/0077445 | A1 | 3/2014 | Morikawa et al. |
| 2014/0077446 | A1 | 3/2014 | Hongo et al. |

FOREIGN PATENT DOCUMENTS

| | | |
|---|---|---|
| JP | 61-169983 | 7/1986 |
| JP | 10-267742 | 10/1998 |
| JP | 11-053602 | 2/1999 |
| JP | 2001-302021 | 10/2001 |
| JP | 2002-205449 | 7/2002 |
| JP | 2003-295707 | 10/2003 |
| JP | 2006-322947 | 11/2006 |
| JP | 2007-079263 | 3/2007 |
| JP | 2008-290288 | 12/2008 |
| JP | 2009-249046 | 10/2009 |
| JP | 2011-112665 | 6/2011 |
| JP | 2012-131579 | 7/2012 |

OTHER PUBLICATIONS

Office action mailed Jul. 9, 2013 for JP 2012-185355 including English translation, 5pp.
Office action mailed Jul. 9, 2013 for JP 2012-185358 including English translation, 4pp.
Office action mailed Jul. 9, 2013 for JP 2012-185378 including English translation, 8pp.
Office action mailed Jul. 9, 2013 for JP 2012-203466 including English translation, 7pp.
Office action mailed Jul. 9, 2013 for JP 2012-203557 including English translation, 7pp.

* cited by examiner

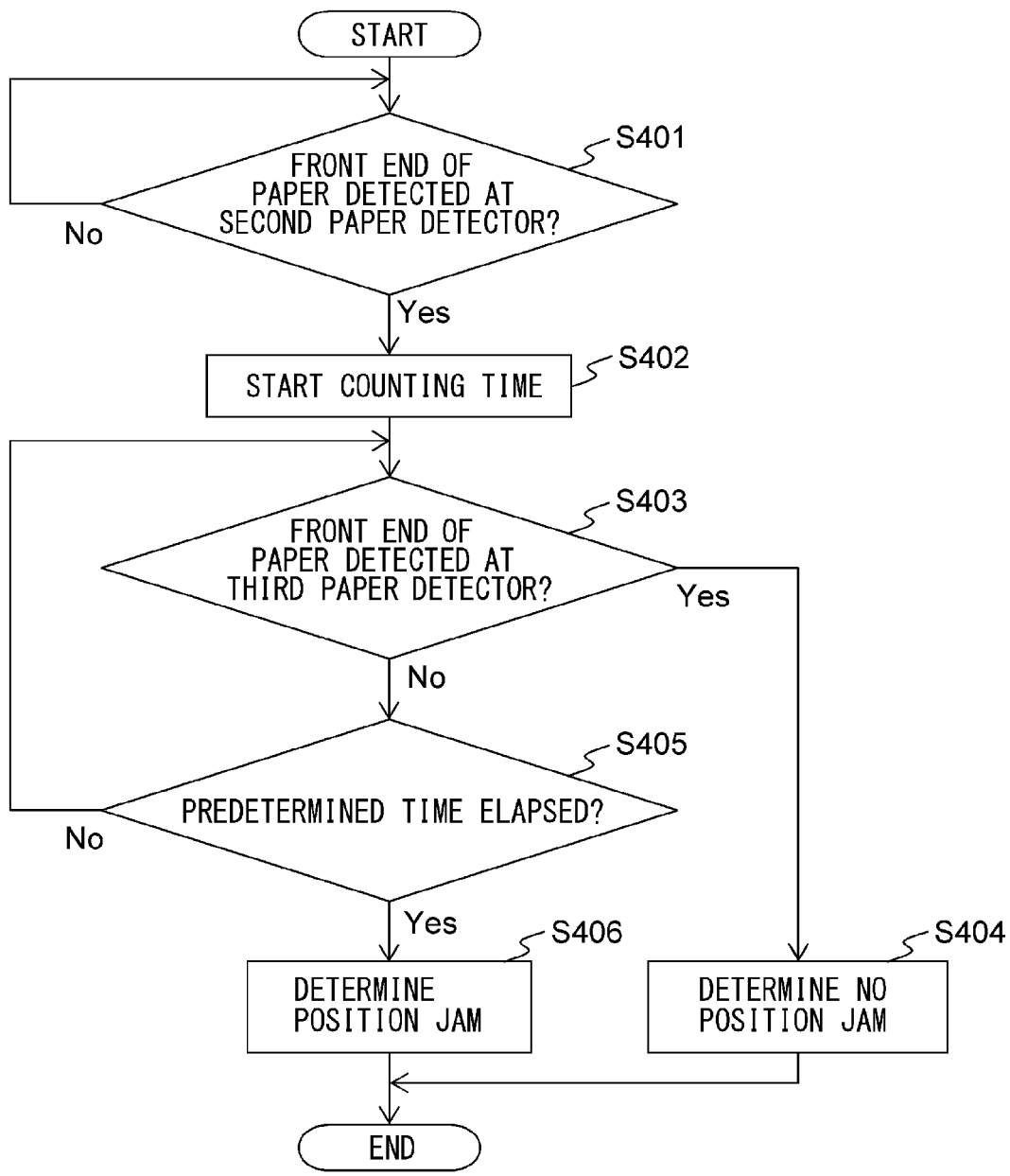

PAPER CONVEYING APPARATUS, JAM DETECTION METHOD, AND COMPUTER-READABLE, NON-TRANSITORY MEDIUM

CROSS-REFERENCE TO RELATED APPLICATIONS

This application is based upon and claims the benefit of priority of prior Japanese Patent Application No. 2012-185358, filed on Aug. 24, 2012, the entire contents of which are incorporated herein by reference.

TECHNICAL FIELD

Embodiments discussed in the present specification relate to paper conveying technology.

BACKGROUND

In a paper conveying apparatus of an image reading apparatus, image copying apparatus, etc., sometimes a jam occurs when the paper moves along the conveyance path. In general, a paper conveying apparatus is provided with the function of determining whether a jam has occurred by a paper being conveyed to a predetermined position inside the conveyance path within a predetermined time from the start of conveyance of the paper and of stopping the operation of the apparatus when a jam has occurred.

On the other hand, if a jam occurs, a large sound is generated in the conveyance path, so the paper conveying apparatus can determine whether a jam has occurred based on the sound which is generated on the conveyance path and thereby detect the occurrence of a jam without waiting for the elapse of the predetermined time.

A jam detection apparatus of a copier which converts the sound which is generated on the conveyance path to an electrical signal and determines that a jam has occurred when the time when the signal is over a reference level exceeds a reference value has been disclosed (see Japanese Laid-open Patent Publication No. 57-169767).

SUMMARY

When for example a paper which has a wrinkle is conveyed or otherwise a large sound is generated at a conveyance path along with conveyance of a paper, sometimes it is erroneously determined that a jam has occurred.

Accordingly, it is an object of the present invention to provide a paper conveying apparatus and a jam detection method which can suppress erroneous detection of an occurrence of a jam by sound due to the sound which is generated along with conveyance of a paper and a computer-readable, non-transitory medium storing a computer program for causing a computer to implement such a jam detection method.

According to an aspect of the apparatus, there is provided a paper conveying apparatus. The paper conveying apparatus includes a first sound signal generator for generating a first sound signal corresponding to a sound generated by a paper during conveyance of the paper, at least a part of the first sound signal generator is provided at one end of a conveyance path of the paper in the direction which perpendicularly intersects the paper conveyance direction, a second sound signal generator for generating a second sound signal corresponding to the sound generated by the paper during conveyance of the paper, at least a part of the second sound signal generator is provided at the other end of the conveyance path of the paper in the direction which perpendicularly intersects the paper conveyance direction, and a sound jam detector for determining whether a jam has occurred based on a difference of the first sound signal and the second sound signal.

According to an aspect of the method, there is provide a jam detection method. The jam detection method includes acquiring a first sound signal from a first sound signal generator for generating the first sound signal corresponding to a sound generated by a paper during conveyance of the paper, at least a part of the first sound signal generator is provided at one end of a conveyance path of the paper in the direction which perpendicularly intersects the paper conveyance direction, acquiring a second sound signal from a second sound signal generator for generating the second sound signal corresponding to the sound generated by the paper during conveyance of the paper, at least a part of the sound signal generator is provided at the other end of the conveyance path of the paper in the direction which perpendicularly intersects the paper conveyance direction, and determining, by a computer, whether a jam has occurred based on a difference of the first sound signal and the second sound signal.

According to an aspect of the computer-readable, non-transitory medium storing a computer program, the computer program causes a computer to execute a process, including acquiring a first sound signal from a first sound signal generator for generating the first sound signal corresponding to a sound generated by a paper during conveyance of the paper, at least a part of the first sound signal generator is provided at one end of a conveyance path of the paper in the direction which perpendicularly intersects the paper conveyance direction, acquiring a second sound signal from a second sound signal generator for generating the second sound signal corresponding to the sound generated by the paper during conveyance of the paper, at least a part of the sound signal generator is provided at the other end of the conveyance path of the paper in the direction which perpendicularly intersects the paper conveyance direction, and determining whether a jam has occurred based on a difference of the first sound signal and the second sound signal.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 14 is a flow chart which shows an example of operation of a position jam detection processing.

DESCRIPTION OF EMBODIMENTS

Hereinafter, a paper conveying apparatus, jam detection method, and computer program according to an embodiment, will be described with reference to the drawings. However, note that the technical scope of the invention is not limited to these embodiments and extends to the inventions described in the claims and their equivalents.

Figure 1:
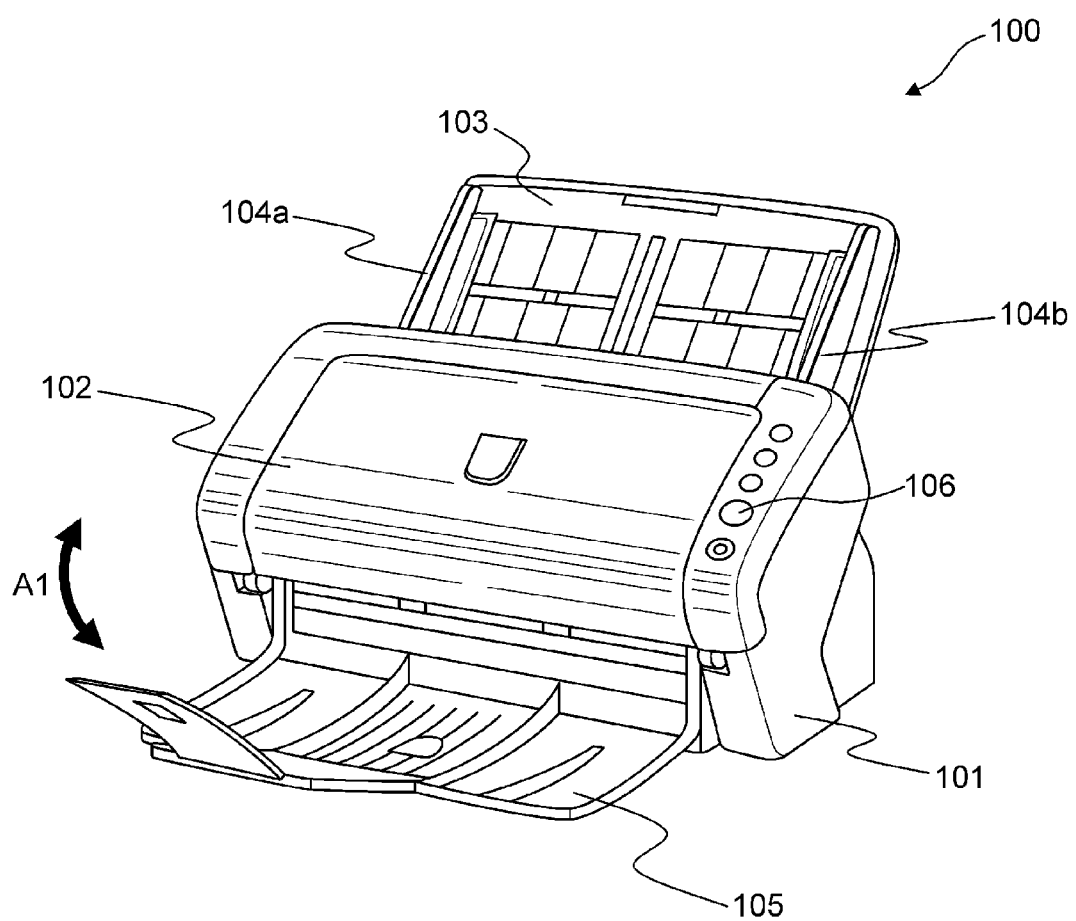
FIG. 1 is a perspective view which shows a paper conveying apparatus 100 according to an embodiment.

FIG. 1 is an exemplary embodiment of a perspective view which shows a paper conveying apparatus 100 which is configured as an image scanner, according to an embodiment.

The paper conveying apparatus 100 includes a lower housing 101, an upper housing 102, a paper tray 103, an ejection tray 105, an operation button 106, etc.

The upper housing 102 is arranged at a position which covers the top surface of the paper conveying apparatus 100 and is engaged with the lower housing 101 by hinges so as to be able to be opened and closed at the time of a paper jam, at the time of cleaning of the inside of the paper conveying apparatus 100, etc.

The paper tray 103 is engaged with the lower housing 101 in a manner enabling a paper to be placed. The paper tray 103 is provided with side guides 104a and 104b which can be moved in a direction perpendicular to a conveyance direction of the paper, that is, to the left and right directions from the conveyance direction of the paper. By positioning the side guides 104a and 104b to match with the width of the paper, it is possible to limit the width direction of the paper.

The ejection tray 105 is engaged with the lower housing 101 by hinges so as to be able to pivot in the direction which is shown by an arrow mark A1. In the opened state as shown in FIG. 1, the ejected paper can be held.

The operation button 106 is arranged on the surface of the upper housing 102. If pushed, it generates and outputs an operation detection signal.

Figure 2:
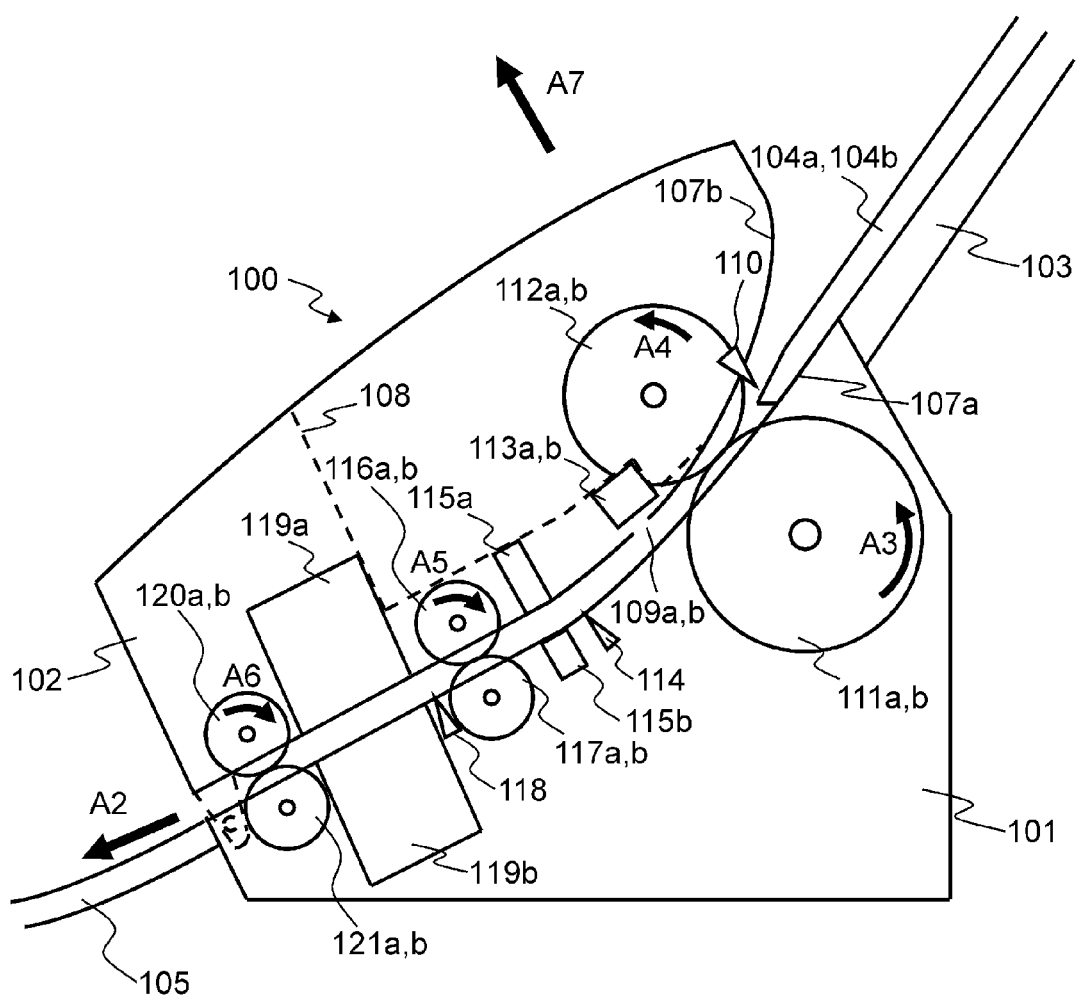
FIG. 2 is a view for explaining an example of a conveyance route at an inside of a paper conveying apparatus 100.

FIG. 2 is a view for explaining an example of the conveyance route at the inside of the paper conveying apparatus 100.

The conveyance route at the inside of the paper conveying apparatus 100 has a first paper detector 110, paper feed rollers 111a, 111b, retard rollers 112a, 112b, a first microphone 113a, a second microphone 113b, a second paper detector 114, an ultrasonic transmitter 115a, an ultrasonic receiver 115b, first conveyor rollers 116a, 116b, first driven rollers 117a, 117b, a third paper detector 118, a first image capture unit 119a, a second image capture unit 119b, second conveyor rollers 120a, 120b, second driven rollers 121a, 121b, etc.

Below, the paper feed rollers 111a and 111b sometimes will be referred to altogether as the "paper feed rollers 111", the retard rollers 112a and 112b sometimes will be referred to altogether as the "retard rollers 112", the first conveyor rollers 116a and 116b sometimes will be referred to altogether as the "first conveyor rollers 116", the first driven rollers 117a and 117b sometimes will be referred to overall as the "first driven rollers 117", the second conveyor rollers 120a and 120b sometimes will be referred to overall as the "second conveyor rollers 120", and the second driven rollers 121a and 121b sometimes will be referred to overall as the "second driven rollers 121".

The top surface of the lower housing 101 forms the lower guide 107a of the conveyance path of the paper, while the bottom surface of the upper housing 102 forms the upper guide 107b of the conveyance path of the paper. In FIG. 2, the arrow mark A2 shows the conveyance direction of the paper. Below, "upstream" means upstream of the conveyance direction A2 of the paper, while "downstream" means downstream of the conveyance direction A2 of the paper.

The first paper detector 110 has a contact detection sensor which is arranged at an upstream side of the paper feed roller 111 and the retard roller 112 and detects if a paper is placed on the paper tray 103. The first paper detector 110 generates and outputs a first paper detection signal which changes in signal value between a state in which a paper is placed on the paper tray 103 and a state in which one is not placed.

The first microphone 113a and the second microphone 113b are examples of sound detectors, respectively detect the sound generated by a paper during conveyance of the paper, and generate and output analog signals corresponding to the detected sound. The first microphone 113a and the second microphone 113b are arranged at the downstream sides of the paper feed rollers 111 and the retard rollers 112 while fastened to the frame 108 inside the upper housing 102. The sound generated by the paper during conveyance of the paper is made to be more accurately detected by the first microphone 113a and the second microphone 113b by holes 109a and 109b being respectively provided at positions of the upper guide 107b facing the first microphone 113a and the second microphone 113b.

The second paper detector 114 has a contact detection sensor which is arranged at a downstream side of the paper feed roller 111 and the retard roller 112 and at an upstream side of the first conveyor roller 116 and first driven roller 117 and detects if there is a paper present at that position. The second paper detector 114 generates and outputs a second paper detection signal which changes in signal value between a state at which there is a paper at that position and a state where there is no paper there.

The ultrasonic transmitter 115a and the ultrasonic receiver 115b are an example of an ultrasonic detector, and are arranged near the conveyance path of the paper so as to face each other across the conveyance path. The ultrasonic transmitter 115a transmits an ultrasonic wave. On the other hand, the ultrasonic receiver 115b detects an ultrasonic wave which is transmitted by the ultrasonic transmitter 115a and passes through the paper or papers, and generates and outputs an ultrasonic signal comprised of an electrical signal corresponding to the detected ultrasonic wave. Below, the ultrasonic transmitter 115a and the ultrasonic receiver 115b will sometimes be referred to altogether as the "ultrasonic sensor 115".

The third paper detector 118 has a contact detection sensor which is arranged at a downstream side of the first conveyor roller 116 and the first driven roller 117 and an upstream side of the first image capture unit 119a and the second image capture unit 119b and detects if there is a paper at that position. The third paper detector 118 generates and outputs a third paper detection signal which changes in signal value between a state where there is a paper at that position and a state where there is no such paper there.

The first image capture unit 119a has a CIS (contact image sensor) of an equal magnification optical system type which is provided with an image capture element using CMOS's (complementary metal oxide semiconductors) which are arranged in a line in the main scan direction. This CIS reads the back surface of the paper and generates and outputs an analog image signal. Similarly, the second image capture unit 119b has a CIS of an equal magnification optical system type which is provided with an image capture element using CMOS's which are arranged in a line in the main scan direction. This CIS reads the front surface of the paper and generates and outputs an analog image signal. Note that, it is also possible to arrange only one of the first image capture unit 119a and the second image capture unit 119b and read only one surface of the paper. Further, instead of a CIS, it is also possible to utilize an image capturing sensor of a reduced magnification optical system type using CCD's (charge coupled devices). Below, the first image capture unit 119a and the second image capture unit 119b will sometimes be referred to overall as the "image capture units 119".

A paper which is placed on the paper tray 103 is conveyed between the lower guide 107a and the upper guide 107b toward the paper conveyance direction A2 by rotation of the paper feed roller 111 in the direction of the arrow mark A3 of FIG. 2. The retard roller 112 rotates in the direction of the arrow mark A4 of FIG. 2 at the time of paper conveyance. Due to the action of the paper feed roller 111 and the retard roller 112, when the paper tray 103 has a plurality of papers placed on it, among the papers which are placed on the paper tray 103, only the paper which is in contact with the paper feed roller 111 is separated. The conveyance of papers other than the separated paper is restricted (prevention of multifeed). The paper feed roller 111 and the retard roller 112 function as a paper separator.

A paper is fed between the first conveyor roller 116 and the first driven roller 117 while being guided by the lower guide 107a and the upper guide 107b. The paper is sent between the first image capture unit 119a and the second image capture unit 119b by the first conveyor roller 116 rotating in the direction of the arrow mark A5 of FIG. 2. The paper which is read by the image capture unit 119 is ejected onto the ejection tray 105 by the second conveyor roller 120 rotating in the direction of the arrow mark A6 of the FIG. 2.

Figure 3:
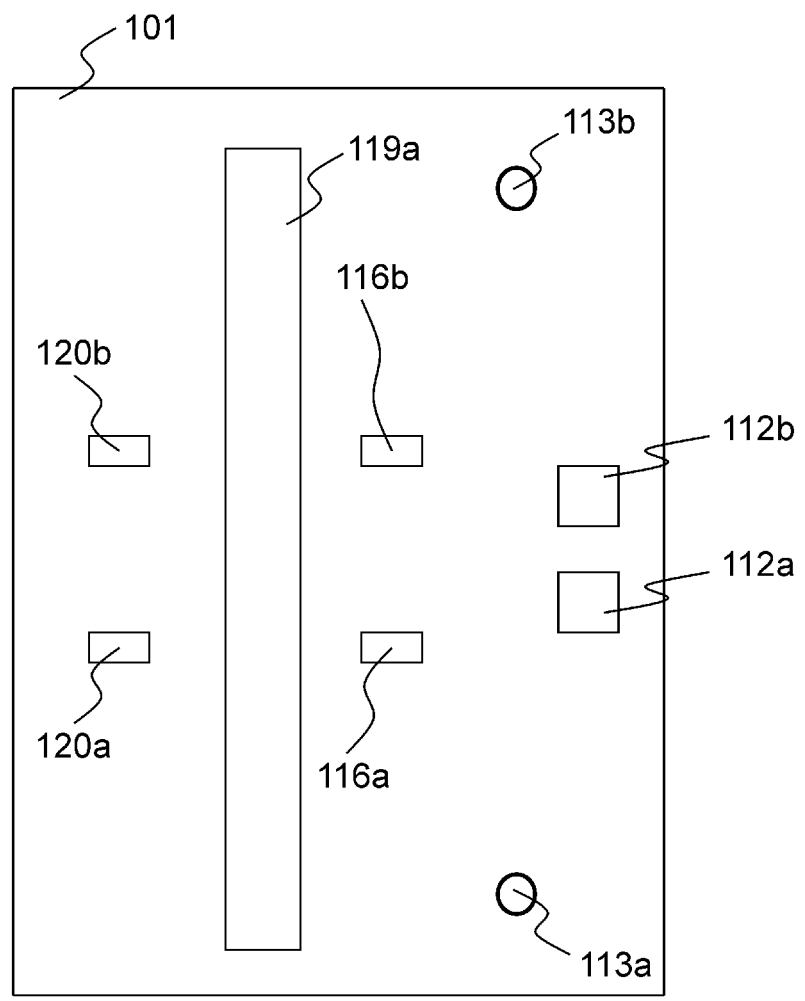
FIG. 3 is an example of a view seen from a lower side in a state detaching an upper housing 102.

FIG. 3 is an example of a view seen from the lower side in the state with the upper housing 102 detached from the paper conveying apparatus 100, that is, a view seen in the direction of the arrow mark A7 of FIG. 2.

As shown in FIG. 3, the first microphone 113a is provided at one end of the conveyance path of the paper in the direction which perpendicularly intersects the paper conveyance direction, while the second microphone 113b is provided at the other end of the conveyance path of the paper in the direction which perpendicularly intersects the paper conveyance direction.

Figure 4:
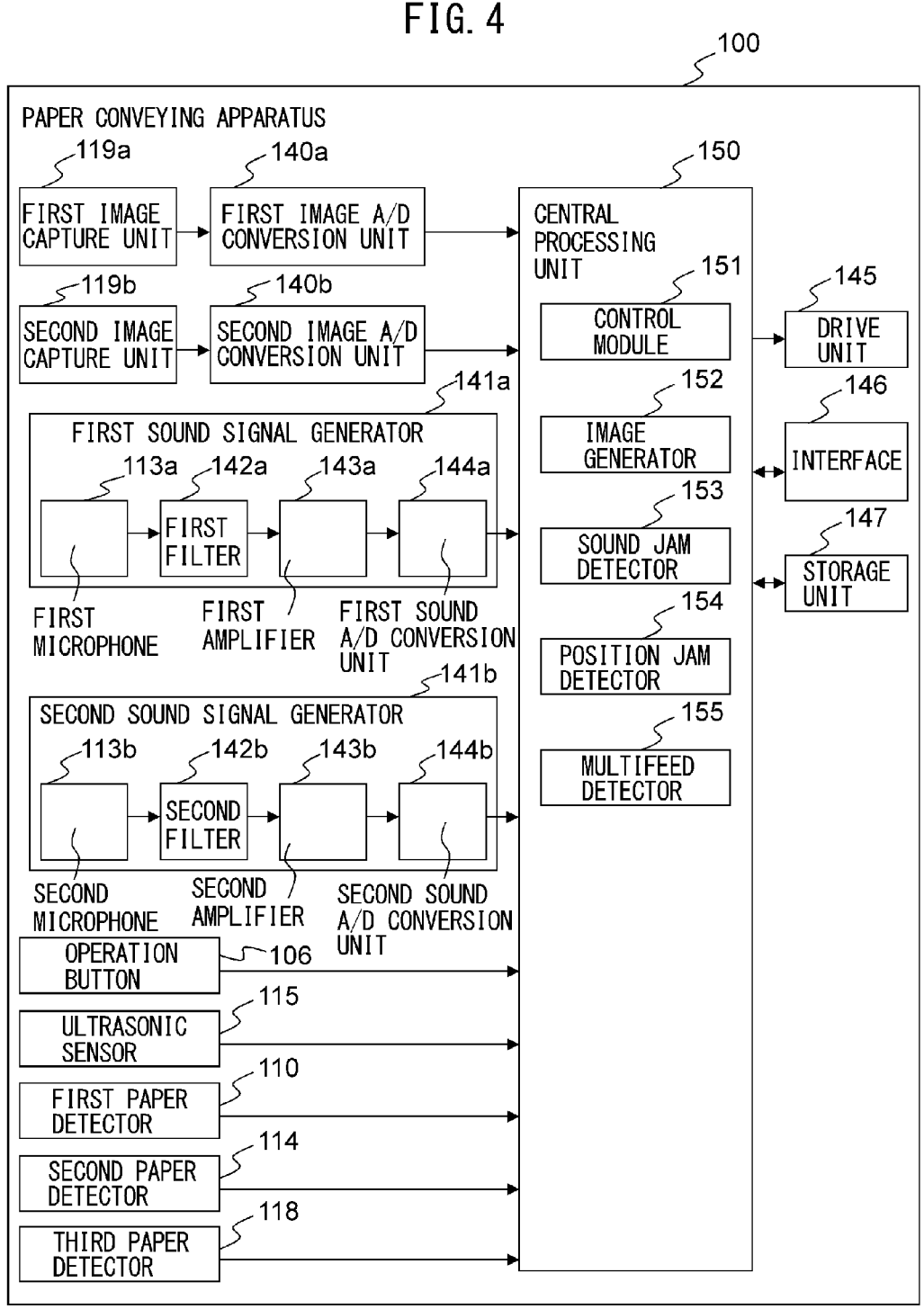
FIG. 4 is an example of a block diagram which shows a schematic configuration of a paper conveying apparatus 100.

FIG. 4 is an example of a block diagram which shows the general configuration of a paper conveying apparatus 100.

The paper conveying apparatus 100, in addition to the above-mentioned configuration, further has a first image A/D conversion unit 140a, a second image A/D conversion unit 140b, a first sound signal generator 141a, a second sound signal generator 141b, a drive unit 145, an interface 146, a storage unit 147, a central processing unit 150, etc.

The first image A/D conversion unit 140a converts an analog image signal which is output from the first image capture unit 119a from an analog to digital format to generate digital image data which it then outputs to the central processing unit 150. Similarly, the second image A/D conversion unit 140b converts the analog image signal which is output from the second image capture unit 119b from an analog to digital format to generate digital image data which it then outputs to the central processing unit 150. Below, these digital image data will be referred to as the "read image".

A first sound signal generator 141a includes the first microphone 113a, the first filter 142a, the first amplifier 143a, the first sound A/D conversion unit 144a, etc., and generates a first source signal. The first filter 142a filters the signal which is output from the first microphone 113a by a bandpass filter which passes a predetermined frequency band of the signal and outputs it to the first amplifier 143a. The first amplifier 143a amplifies the signal which is output from the first filter 142a and outputs it to the first sound A/D conversion unit 144a. The first sound A/D conversion unit 144a converts the analog signal which is output from the first amplifier 143a to a digital first source signal and outputs it to the central processing unit 150.

A second sound signal generator 141b includes the second microphone 113b, the second filter 142b, the second amplifier 143b, the second sound A/D conversion unit 144b, etc., and generates a second source signal. The second filter 142b filters the signal which is output from the second microphone 113b by a bandpass filter which passes a predetermined frequency band of the signal and outputs it to the second amplifier 143b. The second amplifier 143b amplifies the signal which is output from the second filter 142b and outputs it to the second sound A/D conversion unit 144b. The second sound A/D conversion unit 144b converts the analog signal which is output from the second amplifier 143b to a digital second source signal and outputs it to the central processing unit 150.

The drive unit 145 includes one or more motors and uses control signals from the central processing unit 150 to rotate the paper feed roller 111, the retard roller 112, the first conveyor roller 116, and the second conveyor roller 121 and operate to convey a paper.

The interface 146 has, for example, a USB or other serial bus-based interface circuit and electrically connects with a not shown information processing apparatus (for example, personal computer, portable data terminal, etc.) to send and receive a read image and various types of information. Further, it is also possible to connect a flash memory etc., to the interface 146 so as to store the read image.

The storage unit 147 has a RAM (random access memory), ROM (read only memory), or other memory device, a hard disk or other fixed disk device, or flexible disk, optical disk, or other portable storage device. Further, the storage unit 147 stores a computer program, database, tables, etc., which are used in various processing of the paper conveying apparatus 100. The computer program may be installed on the storage unit 147 from a computer-readable, non-transitory medium such as a compact disk read only memory (CD-ROM), a digital versatile disk read only memory (DVD-ROM), or the like by using a well-known setup program or the like. Furthermore, the storage unit 147 stores the read image.

The central processing unit 150 is provided with a CPU (central processing unit) and operates based on a program which is stored in advance in the storage unit 147. Note that, the central processing unit 150 may also be comprised of a DSP (digital signal processor), LSI (large scale integrated circuit), ASIC (application specific integrated circuit), FPGA (field-programming gate array), etc.

The central processing unit 150 is connected to the operation button 106, first paper detector 110, second paper detector 114, ultrasonic sensor 115, third paper detector 118, first image capture unit 119a, second image capture unit 119b, first image A/D conversion unit 140a, second image A/D conversion unit 140b, first sound signal generator 141a, second sound signal generator 141b, drive unit 145, interface 146, and storage unit 147 and controls these parts.

The central processing unit 150 control a drive operation of the drive unit 145, control a paper read operation of the image capture unit 119, etc., to acquire a read image. Further, the central processing unit 150 has a control module 151, an image generator 152, a sound jam detector 153, a position jam detector 154, a multifeed detector 155, etc. These units are functional modules which are realized by software which operate on a processor. Note that, these units may be comprised of respectively independent integrated circuits, a microprocessor, firmware, etc.

Figure 5:
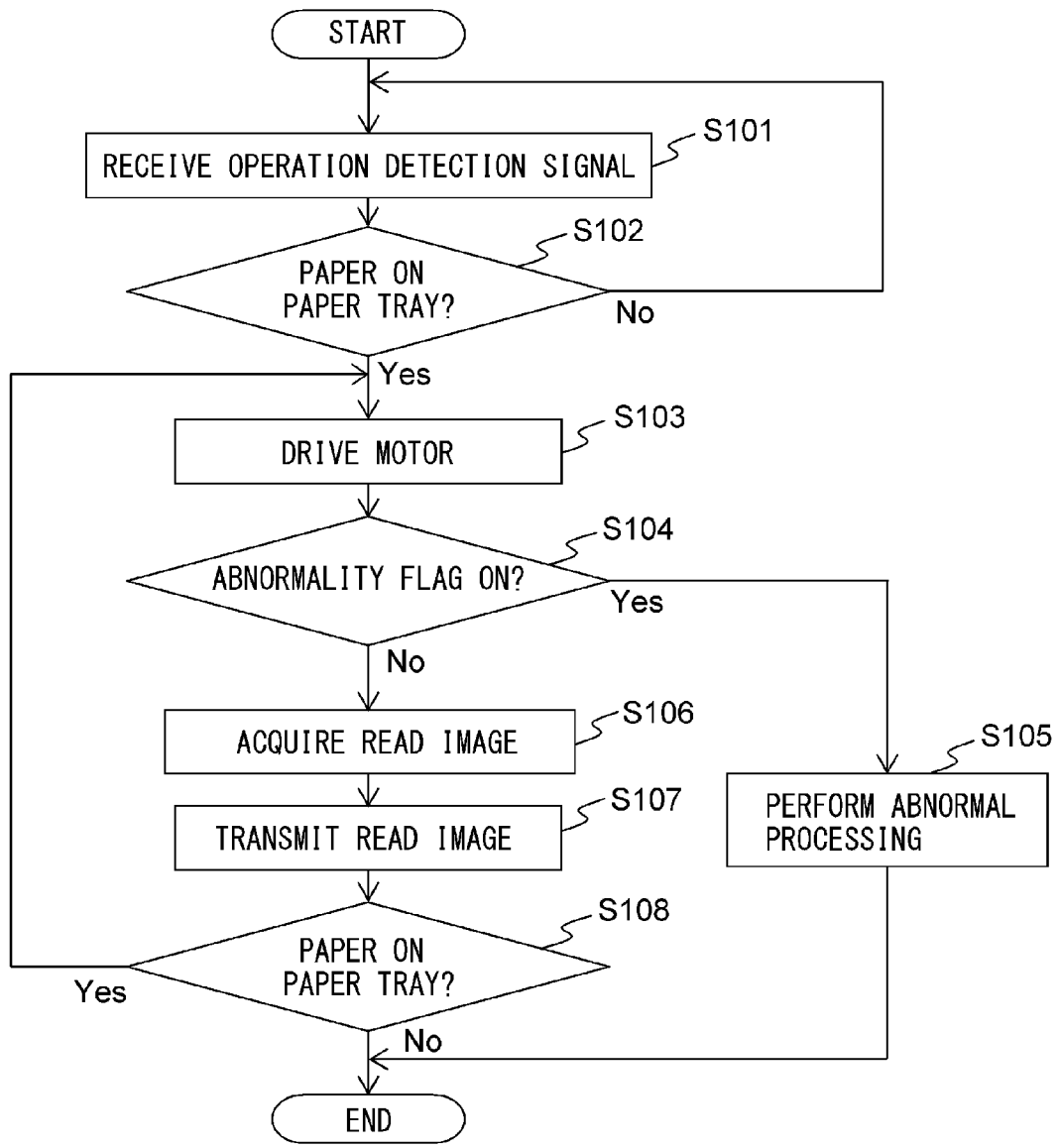
FIG. 5 is a flow chart which shows an example of operation of overall processing of a paper conveying apparatus 100.

FIG. 5 is a flow chart which shows an example of operation of overall processing of the paper conveying apparatus 100.

Below, referring to the flow chart which is shown in FIG. 5, an example of the operation of the overall processing of the paper conveying apparatus 100 will be explained. Note that, the flow of the operation which is explained below is performed based on a program which is stored in advance in the storage unit 147 mainly by the central processing unit 150 in cooperation with the elements of the paper conveying apparatus 100.

First, the central processing unit 150 stands by until a user pushes the operation button 106 and an operation detection signal is received from the operation button 106 (step S101).

Next, the central processing unit 150 determines whether the paper tray 103 has a paper placed on it based on the first paper detection signal which was received from the first paper detector 110 (step S102).

If the paper tray 103 does not have a paper placed on it, the central processing unit 150 returns the processing to step S101 and stands by until newly receiving an operation detection signal from the operation button 106.

On the other hand, when the paper tray 103 has a paper placed on it, the central processing unit 150 drives the drive unit 145 to rotate the paper feed roller 111, retard roller 112, first conveyor roller 116, and second conveyor roller 121 and convey the paper (step S103).

Next, the control module 151 determines whether an abnormality flag is ON or not (step S104). This abnormality flag is set OFF at the time of startup of the paper conveying apparatus 100 and is set ON if a later explained abnormality detection processing determines that an abnormality has occurred.

When the abnormality flag is ON, the control module 151, as an abnormal processing, stops the drive unit 145 to stop the conveyance of the paper, uses a not shown speaker, LED (light emitting diode), etc. to notify the user of the occurrence of an abnormality, sets the abnormality flag OFF (step S105), and ends the series of steps.

On the other hand, when the abnormality flag is not ON, the image generator 152 makes the first image capture unit 120a and the second image capture unit 120b read the conveyed paper and acquires the read image through the first image A/D conversion unit 140a and the second image A/D conversion unit 140b (step S106).

Next, the central processing unit 150 transmits the acquired read image through the interface 146 to a not shown information processing apparatus (step S107). Note that, when not connected to an information processing apparatus, the central processing unit 150 stores the acquired read image in the storage unit 147.

Next, the central processing unit 150 determines whether the paper tray 103 has a paper remaining thereon based on the first paper detection signal which was received from the first paper detector 110 (step S108).

When the paper tray 103 has a paper remaining thereon, the central processing unit 150 returns the processing to step S103 and repeats the processing of steps S103 to S108. On the other hand, when the paper tray 103 does not have any paper remaining thereon, the central processing unit 150 ends the series of processing.

Figure 6:
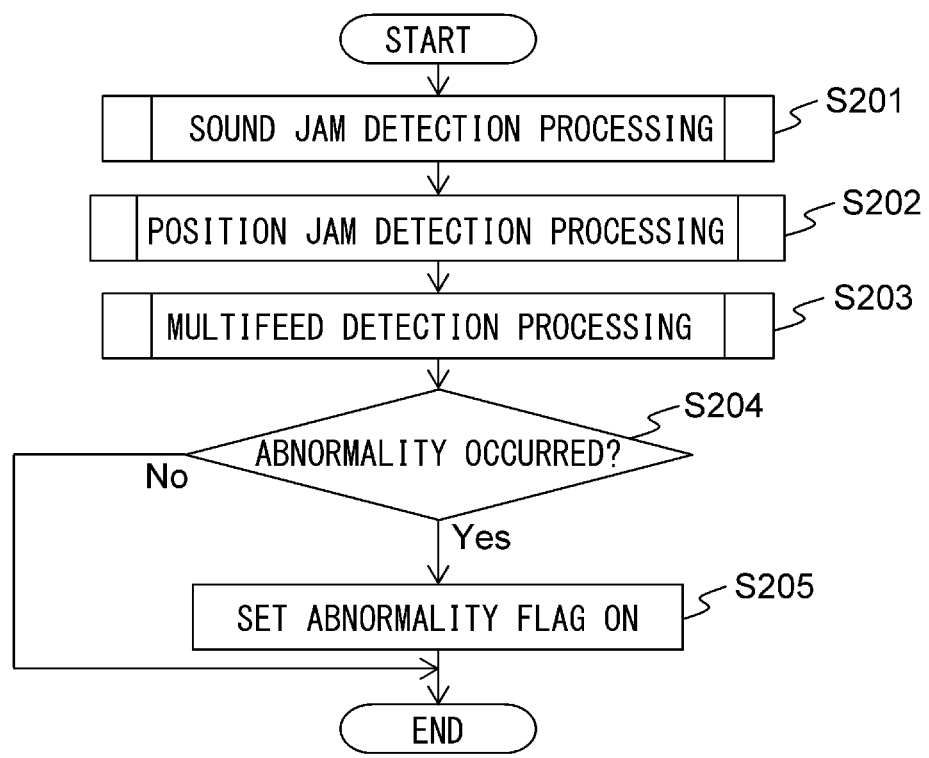
FIG. 6 is a flow chart which shows an example of an abnormality detection of the paper conveyance.

FIG. 6 is a flow chart which shows an example of an abnormality detection of the paper conveyance of the paper conveying apparatus 100.

The flow of operation which is explained below is executed based on a program which is stored in advance in the storage unit 147 mainly by the central processing unit 150 in cooperation with the elements of the paper conveying apparatus 100.

First, the sound jam detector 153 executes sound jam detection processing (step S201). In the sound jam detection processing, the jam detector 153 determines whether a jam has occurred based on the difference between the first source signal which is acquired from the first sound signal generator 141a and the second source signal which is acquired from the second sound signal generator 141b. Below, sometimes a jam which is determined to exist by the sound jam detector 153 based on a sound signal will be called a "sound jam". Details of the sound jam detection processing will be explained later.

Next, the position jam detector 154 performs position jam detection processing (step S202). In the position jam detection processing, the position jam detector 154 determines the occurrence of a jam based on the second paper detection signal which is acquired from the second paper detector 114 and the third paper detection signal which is acquired from the third paper detector 118. Below, sometimes a jam which is determined to exist by the position jam detector 154 based on the second paper detection signal and third paper detection signal will be called a "position jam". Details of the position jam detection processing will be explained later.

Next, the multifeed detector 155 performs multifeed detection processing (step S203). In the multifeed detection processing, the multifeed detector 155 determines the occurrence of a multifeed of papers based on the ultrasonic signal which was acquired from the ultrasonic sensor 115. Details of the multifeed detection processing will be explained later.

Next, the control module 151 determines whether an abnormality has occurred in the paper conveyance processing (step S204). The control module 151 determines that an abnormality has occurred if at least one of a sound jam, position jam, and paper multifeed has occurred. That is, it is determined that no abnormality has occurred when none of a sound jam, position jam, or paper multifeed has occurred.

The control module 151 sets the abnormality flag to ON (step S205) and ends the series of steps when an abnormality occurs in the paper conveyance processing. On the other hand, when no abnormality occurs in the paper conveyance processing, it ends the series of steps without particularly performing any further processing. Note that, the flow chart which is shown in FIG. 5 is repeatedly executed every predetermined time interval.

Figure 7:
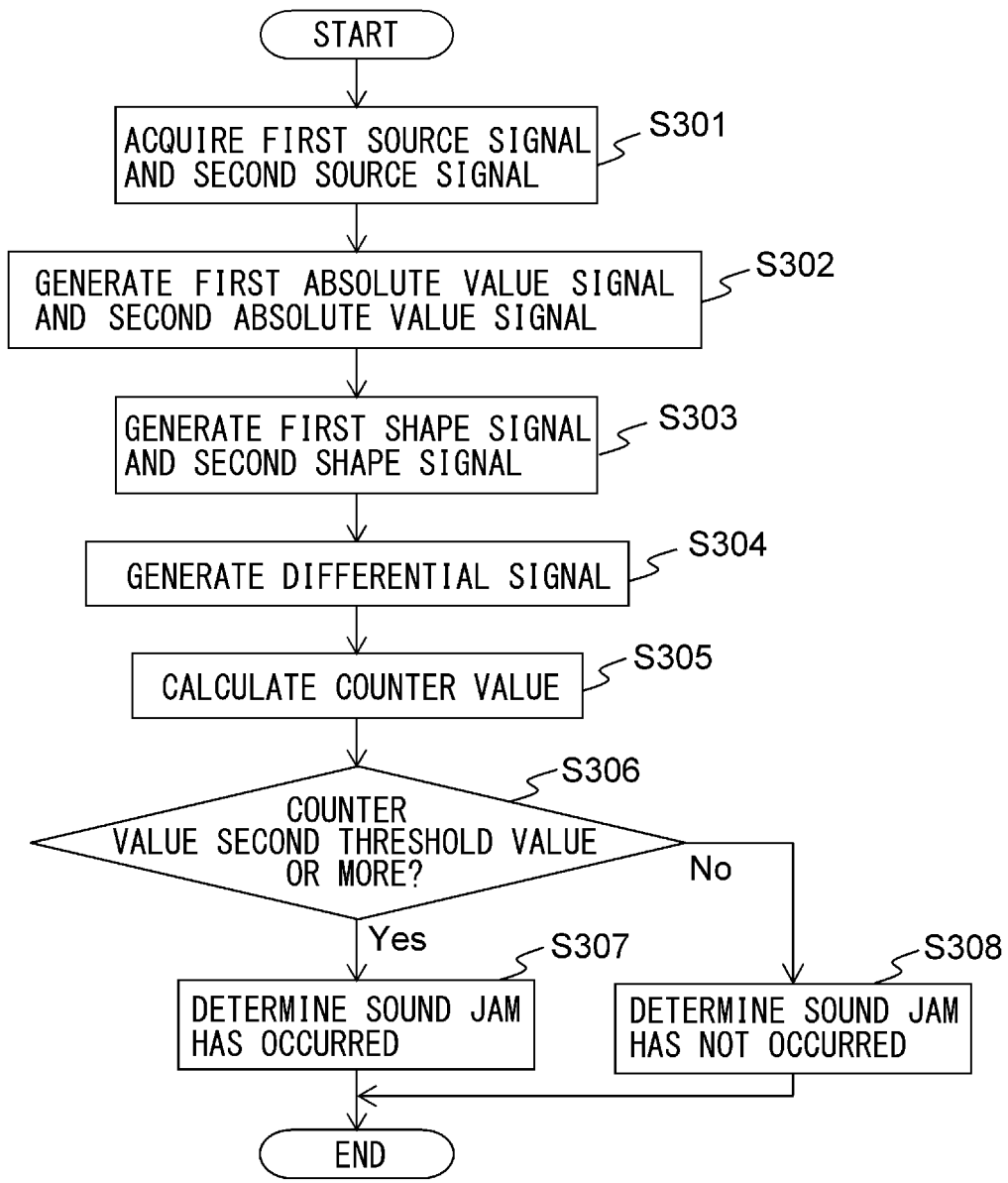
FIG. 7 is a flow chart which shows an example of operation of sound jam detection processing.

FIG. 7 is a flow chart which shows an example of operation of a sound jam detection processing.

The flow of operation which is shown in FIG. 7 is executed at step S201 of the flow chart which is shown in FIG. 6.

First, the sound jam detector 153 acquires a first source signal from the first sound signal generator 141a and acquires a second source signal from the second sound signal generator 141b (step S301).

Next, the sound jam detector 153 generates a first absolute value signal of the absolute value for the first source signal and a second absolute value signal of the absolute value for the second source signal (step S302).

Next, the sound jam detector 153 generates a first shape signal which is a shape extracted from the first absolute value signal and a second shape signal which is a shape extracted from the second absolute value signal (step S303). The sound jam detector 153 generates, as the first shape signal and the second shape signal, signals of the peak hold for the first absolute value signal and the second absolute value signal. The sound jam detector 153 holds the local maximum values of the absolute value signals for exactly a certain hold time period and causes them to attenuate after that by a certain attenuation rate so as to generate shape signals.

Next, the sound jam detector 153 generates a differential signal which shows the difference between the first shape signal and the second shape signal (step S304). The sound jam detector 153 calculates the absolute value of the difference of signals values at the same time for the first shape signal and the second shape signal and generates a signal arranging the calculated absolute values in time sequence as a differential signal.

Next, the sound jam detector 153 calculates a counter value which increases the signal value of the differential signal when it is the first threshold value Th1 or more and decreases it when it is less than the first threshold value Th1 (step S305). The sound jam detector 153 determines whether the signal value of the differential signal is the first threshold value Th1 or more every predetermined time interval (for example, every sampling interval of the sound signal), increments the counter value when the signal value of the differential signal is the first threshold value Th1 or more, and decrements the counter value when it is less than the first threshold value Th1.

Next, the sound jam detector 153 determines whether the counter value is the second threshold value Th2 or more (step S306). The sound jam detector 153 determines that a sound jam has occurred if the counter value is the second threshold value Th2 or more (step S307), determines that a sound jam has not occurred if the counter value is less than the second threshold value Th2 (step S308), and ends the series of steps.

Note that, the first sound signal generator 141a is not limited to the configuration which is shown in FIG. 4. The first sound signal generator 141a may be provided with only the first microphone 113a, while the first filter 142a, first amplifier 143a, and first sound A/D conversion unit 144a may be provided at the outside of the first sound signal generator 141a. Further, the first sound signal generator 141a may be provided with only the first microphone 113a and first filter 142a or only the first microphone 113a, first filter 142a, and first amplifier 143a. Furthermore, the first sound signal generator 141a may be provided, in addition to the parts which are shown in FIG. 4, with an absolute value signal generator which generates a first absolute value signal from the first source signal. Furthermore, the first sound signal generator 141a may be provided, in addition to the parts which are shown in FIG. 4, with an absolute value signal generator which generates a first absolute value signal from the first source signal and a shape signal generator which generates a first shape signal from the first absolute value signal.

Similarly, the second sound signal generator 141b is not limited to the configuration which is shown in FIG. 4. The second sound signal generator 141b may be provided with only the second microphone 113b, while the second filter 142b, second amplifier 143b, and second sound A/D conversion unit 144b may be provided at the outside of the second sound signal generator 141b. Further, the second sound signal generator 141b may be provided with only the second microphone 113b and second filter 142b or only the second microphone 113b, second filter 142b, and second amplifier 143b. Furthermore, the second sound signal generator 141a may be provided, in addition to the parts which are shown in FIG. 4, with an absolute value signal generator which generates a second absolute value signal from the second source signal. Furthermore, the second sound signal generator 141b may be provided, in addition to the parts which are shown in FIG. 4, with an absolute value signal generator which generates a second absolute value signal from the second source signal and a shape signal generator which generates a second shape signal from the second absolute value signal.

Further, the sound jam detector 153 may determine whether a jam has occurred based on the difference between the signal which the first microphone 113a outputs and the signal which the second microphone 113b outputs. In this case, it filters the differential signal of the difference between the signal which the first microphone 113a outputs and the signal which the second microphone 113b outputs by a predetermined bandpass filter, amplifies and converts the result to a digital format, acquires the absolute value, and extracts the shape for utilization for detection of a jam.

Further, the sound jam detector 153 may also determine whether a jam has occurred based on the difference between the signal which the first filter 142a outputs and the signal which the second 142b outputs. In this case, it amplifies the differential signal of the difference between the signal which the first filter 142a outputs and the signal which the second 142b outputs, converts it to a digital format, acquires an absolute value, and extracts the shape for utilization for detection of a jam.

Further, the sound jam detector 153 may determine whether a jam has occurred based on the difference between the signal which the first amplifier 143a outputs and the signal which the second amplifier 143b outputs. In this case, it converts the differential signal of the difference between the signal which the first amplifier 143a outputs and the signal which the second amplifier 143b outputs to a digital format, acquires an absolute value, and extracts the shape for utilization for detection of a jam.

Further, the sound jam detector 153 may determine whether a jam has occurred based on the difference of the first source signal and the second source signal. In this case, the sound jam detector 153 acquires the absolute value of the differential signal of the difference between the first source signal and the second source signal and extracts the shape for utilization for detection of a jam.

Further, the sound jam detector 153 may determine whether a jam has occurred based on the difference between the first absolute value signal and the second absolute value signal. In this case, the sound jam detector 153 extracts the shape of the differential signal of the difference of the first absolute value signal and the second absolute value signal for utilization for detection of a jam.

Below, the significance of determining whether a jam has occurred based on a differential signal, will be explained.

Figure 8:
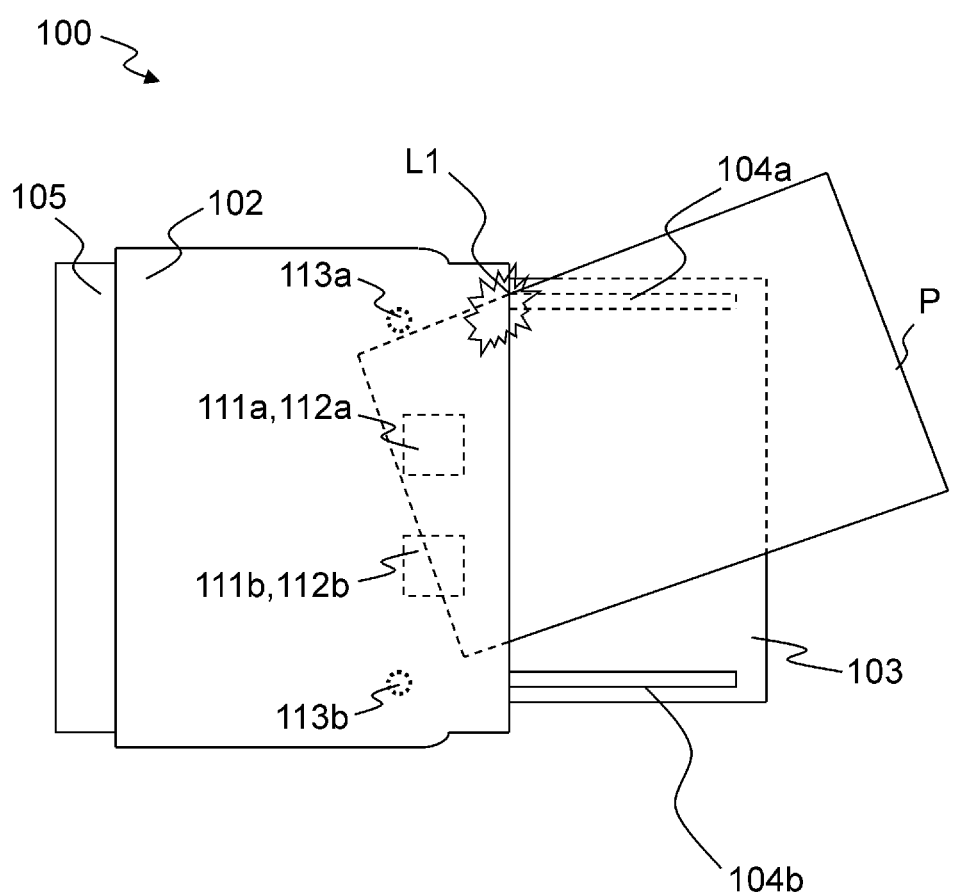
FIG. 8 is a view for explaining a skew jam.

FIG. 8 is a view for explaining a skew jam.

As shown in FIG. 8, if the paper P is conveyed at a skew with respect to the paper conveyance direction, the rear end of the paper P ends up riding over the side guides 104a on the paper tray 103. Furthermore, if the paper P is conveyed, at the position L1 near the position where the lower housing 101 and the paper tray 103 engage, the end of the paper P hits the side walls of the conveyance path of the paper and a large sound is generated. The jam which is caused as a result of a paper being conveyed at a skew in this way is called a "skew jam".

Figure 9:
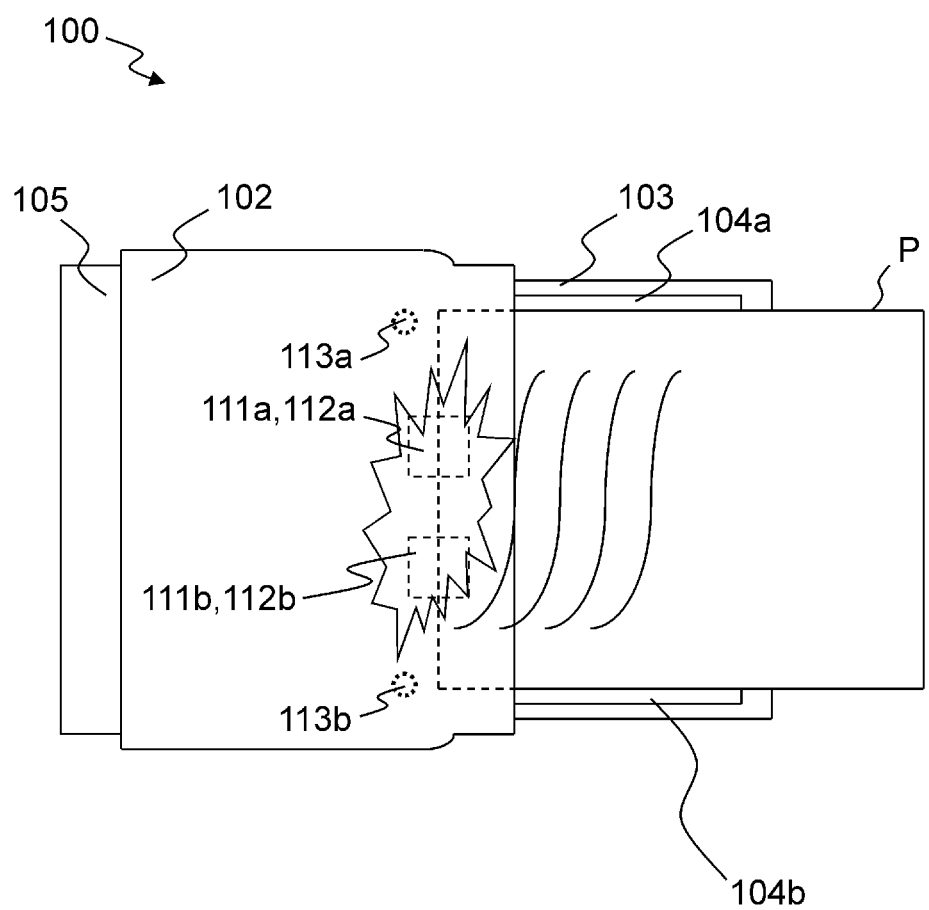
FIG. 9 is a view for explaining a case where a paper which has a wrinkle is conveyed.

FIG. 9 is a view for explaining the case where a paper which has a wrinkle is conveyed.

As shown in FIG. 9, if a paper P which has a wrinkle is conveyed, when the paper P passes between the paper feed rollers 111 and the retard rollers 112, even if a jam does not occur, the wrinkle causes a large sound to be generated. The first microphone 113a and second microphone 113b detect this sound which is generated by the wrinkle.

However, the first microphone 113a and the second microphone 113b are provided at one end and the other end of the conveyance path of the paper. The distance from the paper feed rollers 111 and the retard rollers 112 which are provided at the center of the conveyance path of the paper to the first microphone 113a and the distance to the second microphone 113b are substantially the same. Therefore, the sound which is generated by a wrinkle, and which is generated at the paper feed rollers 111 and the retard rollers 112 is detected at the first microphone 113a and the second microphone 113b at the same extent of magnitude.

FIG. 10 are graphs which show examples of signals for detection of a sound jam in the case where a paper which has a wrinkle is conveyed.

Figure 10A:
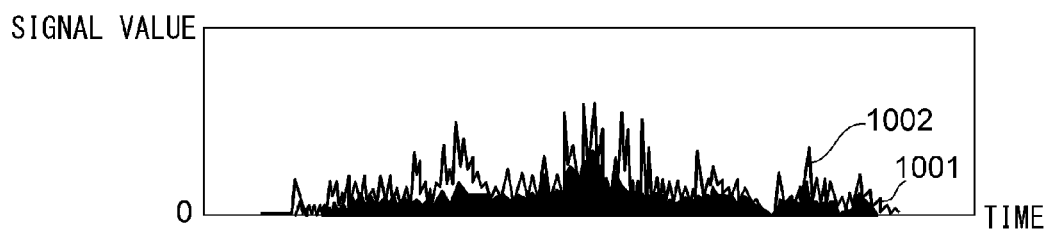
FIG. 10A is a graph which shows an example of a first shape signal for a paper which has a wrinkle.
Figure 10B:
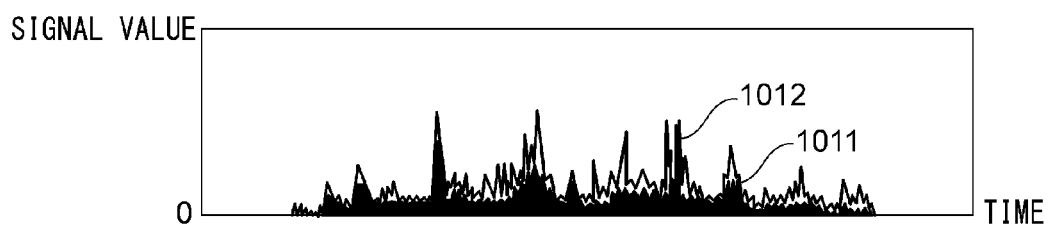
FIG. 10B is a graph which shows an example of a second shape signal for a paper which has a wrinkle.
Figure 10C:
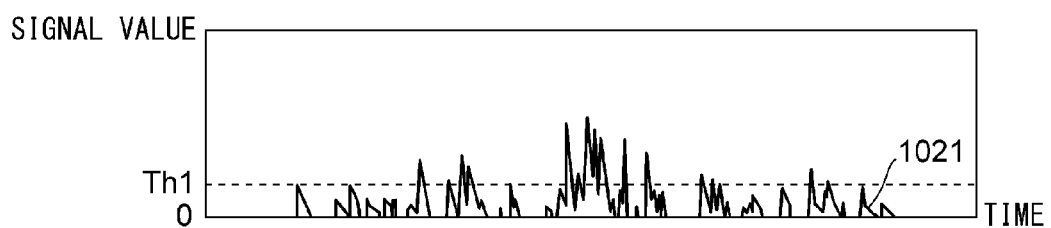
FIG. 10C is a graph which shows an example of a differential signal for a paper which has a wrinkle.
Figure 10D:
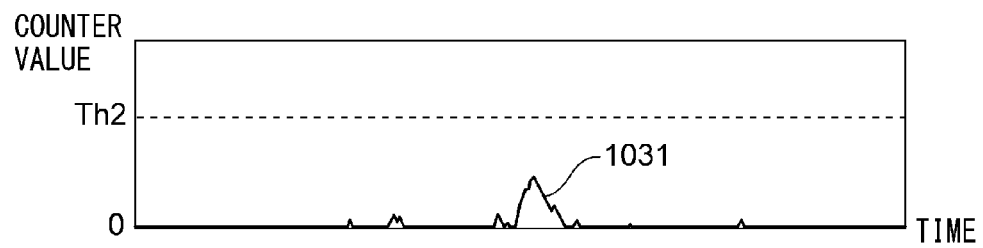
FIG. 10D is a graph which shows an example of a counter value for a paper which has a wrinkle.

The abscissas in FIG. 10A, FIG. 10B, FIG. 10C, and FIG. 10D show the time, the ordinates in FIG. 10A, FIG. 10B, and FIG. 10C show the signal value, and the ordinate in FIG. 10D shows the counter value. The graph of FIG. 10A shows an example of a first absolute value signal 1001 in the case where a paper which has a wrinkle is conveyed and a first shape signal 1002 which is generated from the first absolute value signal 1001 (see FIG. 8, steps S302 and S303). The graph of FIG. 10B shows an example of a second absolute value signal 1011 in the case where a paper which has a wrinkle is conveyed and a second shape signal 1012 which is generated from the second absolute value signal 1011 (see FIG. 8, steps S302 and S303). The graph of FIG. 10C shows an example of a first shape signal 1002 and a differential signal 1021 which is generated from the second shape signal 1012 (see FIG. 8, step S304). The graph of FIG. 10D shows an example of a counter value 1031 which is calculated for the differential signal 1021 (see FIG. 8, step S305).

As shown in FIG. 10A and FIG. 10B, the first shape signal 1002 which is based on the sound which the first microphone 113a detects and the second shape signal 1012 which is based on the sound which the second microphone 113b detects become about the same extent of magnitude. As shown in FIG. 10C, the signal value of the differential signal 1021 which is generated based on the difference of the first shape signal 1002 and the second shape signal 1012 frequently does not become the first threshold value Th1 or more. Therefore, as shown in FIG. 10D, the counter value does not become the second threshold value Th2 or more and it is not determined that a sound jam has occurred when a paper which has a wrinkle is conveyed.

The differential signal 1021 is generated by subtracting the second shape signal 1012 from the first shape signal 1002, so becomes a signal from which components of the sound generated by the wrinkle of the paper are substantially removed,. Here, "components of the sound generated by the wrinkle of the paper" means the parts of the signal values of the signals, based on the sound which the first microphone 113a or the second microphone 113b detects, which become high due to the sound which is generated when a paper which has a wrinkle passes between the paper feed rollers 111 and the retard rollers 112. The "signal from which components of the sound generated by the wrinkle of the paper are substantially removed" means the signal reduced in the effects due to sound generated by a wrinkle of a paper from the signals based on sound which the first microphone 113a or second microphone 113b detects. The sound jam detector 153 determines the presence of a jam based on the differential signal "from which components of the sound generated by the wrinkle of the paper are substantially removed", so can suppress errors in detection of a jam due to a sound which is generated by a wrinkle of a paper.

Figure 11:
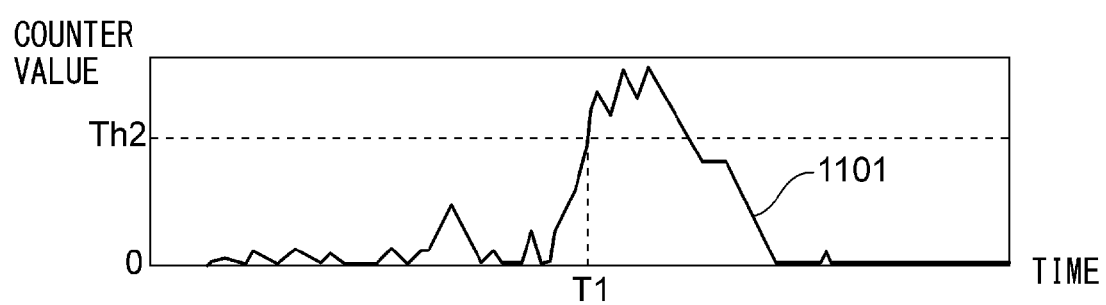
FIG. 11 is a graph which shows an example of a counter value for a signal of FIG. 10A.

FIG. 11 is a graph which shows an example of a counter value 1101 which is calculated for the first shape signal 1002 of FIG. 10A.

The abscissa in FIG. 11 shows the time, while the ordinate shows the counter value. In FIG. 11, the counter value 1101 is calculated so as to be increased when the first shape signal 1002 is the first threshold value Th1 or more and so as to be decreased when it is less than the first threshold value Th1. As shown in FIG. 11, the counter value 1101 which is calculated for the first shape signal 1002 becomes the second threshold value Th2 or more at the time T1. That is, if using only one of the sound which the first microphone 113a detects and the sound which the second microphone 113b detects as the basis to determine the occurrence of a jam, there is a possibility of erroneous detection of occurrence of a jam due to the sound which is generated due to a wrinkle of a paper.

FIG. 12 gives graphs which show examples of signals for detection of a sound jam in a case where a paper which does not have a wrinkle is conveyed and a skew jam which is shown in FIG. 8 occurs.

Figure 12A:
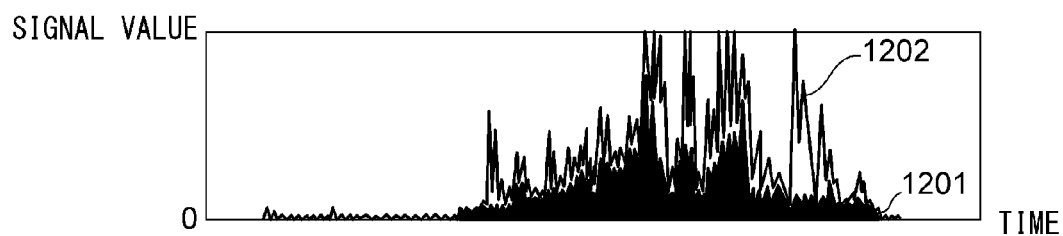
FIG. 12A is a graph which shows an example of a first shape signal at the time of occurrence of a skew jam.
Figure 12B:
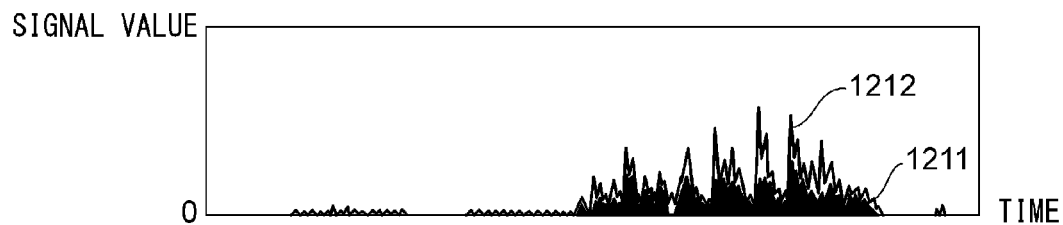
FIG. 12B is a graph which shows an example of a second shape signal at the time of occurrence of a skew jam.
Figure 12C:
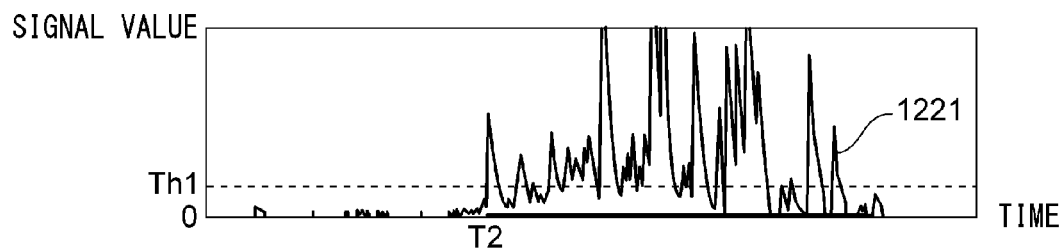
FIG. 12C is a graph which shows an example of a differential signal at the time of occurrence of a skew jam.
Figure 12D:
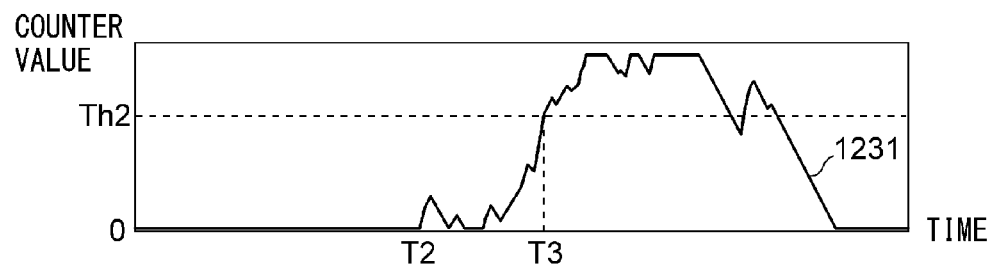
FIG. 12D is a graph which shows an example of a counter value at the time of occurrence of a skew jam.

The abscissas of FIG. 12A, FIG. 12B, FIG. 12C, and FIG. 12D show the time, the ordinates of FIG. 12A, FIG. 12B, and FIG. 12C show the signal value, and the ordinate of FIG. 12D shows the counter value. The graph of FIG. 12A shows an example of a first absolute value signal 1201 in the case where a paper which does not have a wrinkle is conveyed and a skew jam occurs and a first shape signal 1202 which is generated from the first absolute value signal 1201. The graph of FIG. 12B shows an example of a second absolute value signal 1211 in the case where a paper which does not have a wrinkle is conveyed and a skew jam occurs, and a second shape signal 1212 which is generated from the second absolute value signal 1211. The graph of FIG. 12C shows an example of a differential signal 1221 which is generated from the first shape signal 1202 and the second shape signal 1212. The graph of FIG. 12D shows an example of a counter value 1231 which is calculated for the differential signal 1221.

If a skew jam which is shown in FIG. 8 is generated, the first microphone 113a close to the position L1 can detect the sound which is generated due to the skew jam well, but the second microphone 113b which is far from the position L1 cannot detect the sound as well as the first microphone 113a.

Therefore, as shown in FIG. 12A and FIG. 12B, the first shape signal 1202 which is based on the sound which the first microphone 113a detects, overall takes a value larger than the second shape signal 1212 which is based on the sound which the second microphone 113b detects. As shown in FIG. 12C, the signal value of the differential signal 1221 which is generated based on the difference between the first shape signal 1202 and the second shape signal 1212 becomes the first threshold value Th1 or more at the time T2, then frequently becomes the first threshold value Th1 or more. As shown in FIG. 12D, the counter value 1231 increases from the time T2, then, while repeatedly increasing and decreasing, becomes the second threshold value Th2 or more at the time T3 whereby it is determined that a sound jam has occurred.

FIG. 13 is a graph which shows an example of the signals for the detection of a sound jam in the case where a paper which has a wrinkle is conveyed and a skew jam has occurred.

Figure 13A:
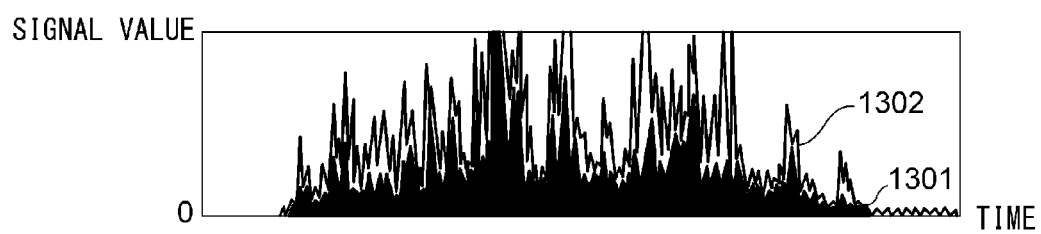
FIG. 13A is a graph which shows an example of a first shape signal at the time of occurrence of a skew jam.
Figure 13B:
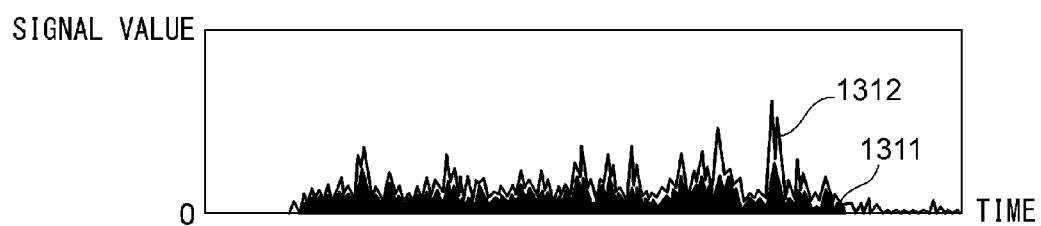
FIG. 13B is a graph which shows an example of a second shape signal at the time of occurrence of a skew jam.
Figure 13C:
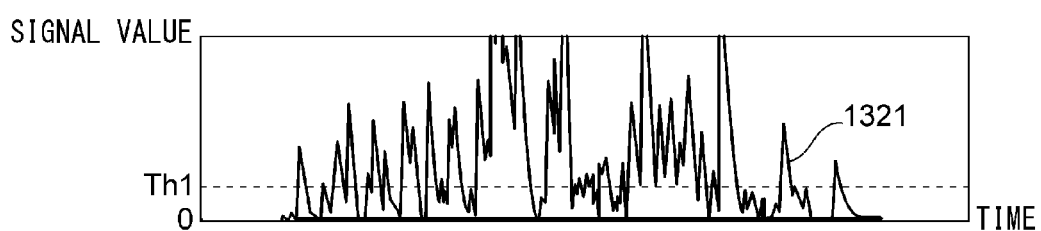
FIG. 13C is a graph which shows an example of a differential signal at the time of occurrence of a skew jam.
Figure 13D:
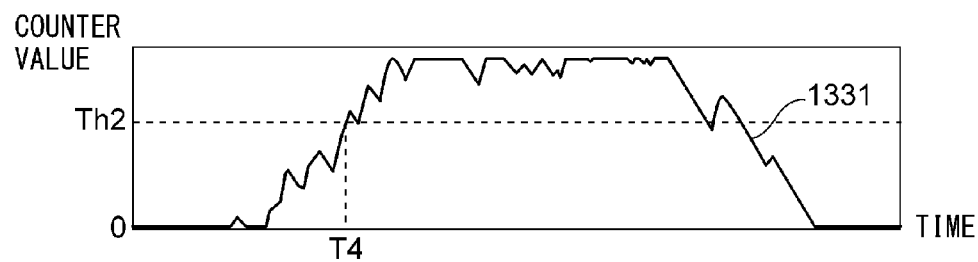
FIG. 13D is a graph which shows an example of a counter value at the time of occurrence of a skew jam.

The abscissas of FIG. 13A, FIG. 13B, FIG. 13C, and FIG. 13D show the time, the ordinates of FIG. 13A, FIG. 13B, and FIG. 13C show the signal value, and the ordinate of FIG. 13D shows the counter value. The graph of FIG. 13A shows an example of a first absolute value signal 1301 in the case where a paper which has a wrinkle is conveyed and a skew jam is generated and a first shape signal 1302 which is generated from the first absolute value signal 1301. The graph of FIG. 13B shows an example of a second absolute value signal 1311 in the case where a paper which has a wrinkle is conveyed and a skew jam occurs and a second shape signal 1312 which is generated from the second absolute value signal 1311. The graph of FIG. 13C shows an example of a differential signal 1321 which is generated from the first shape signal 1302 and the second shape signal 1312. The graph of FIG. 13D shows an example of a counter value 1331 which is calculated for the differential signal 1321.

As shown in FIG. 13C, the differential signal 1321 becomes smaller than the first shape signal 1302 of FIG. 13A since the sound which is generated by the wrinkle of a paper is substantially removed. However, the sound which is generated by a skew jam is sufficiently large, so, as shown in FIG. 13D, at the time T4, the counter value 1331 becomes the second threshold value Th2 or more and it is determined that a sound jam has occurred.

In the above way, the sound jam detector 153 does not determine that a sound jam has occurred when a skew jam has not occurred even if a paper which has a wrinkle is conveyed. On the other hand, the sound jam detector 153 can determine that a sound jam has occurred when a skew jam has occurred regardless of whether the paper has a wrinkle.

FIG. 14 is a flow chart which shows an example of operation of a position jam detection processing.

The flow of operation which is shown in FIG. 14 is executed at step S202 of the flow chart which is shown in FIG. 6.

First, the position jam detector 154 stands by until the front end of the paper is detected by the second paper detector 114 (step S401). The position jam detector 154 determines that the front end of the paper is detected at the position of the second paper detector 114, that is, downstream of the paper feed roller 111 and retard roller 112 and upstream of the first conveyor roller 116 and first driven roller 117, when the value of the second paper detection signal from the second paper detector 114 changes from a value which shows the state where there is no paper to a value which shows the state where there is one.

Next, when the second paper detector 114 detects the front end of a paper, the position jam detector 154 starts counting time (step S402).

Next, the position jam detector 154 determines whether the third paper detector 118 has detected the front end of the paper (step S403). The position jam detector 154 determines that the front end of the paper is detected at the position of the third paper detector 118, that is, downstream of the first conveyor roller 116 and first driven roller 117 and upstream of the image capture unit 119, when the value of the third paper detection signal from the third paper detector 118 changes from a value which shows the state where there is no paper to a value which shows the state where there is one.

When the third paper detector 118 detects the front end of a paper, the position jam detector 154 determines that no position jam has occurred (step S404) and ends the series of steps.

On the other hand, if the third paper detector 118 detects the front end of the paper, the position jam detector 154 determines whether a predetermined time (for example, 1 second) has elapsed from the start of counting time (step S405). If a predetermined time has not elapsed, the position jam detector 154 returns to the processing of step S403 and again determines whether the third paper detector 118 has detected the front end of the paper. On the other hand, when a predetermined time has elapsed, the position jam detector 154 determines that position jam has occurred (step S406) and ends the series of steps. Note that, when position jam detection processing is not required in the paper conveying apparatus 100, this may be omitted.

Note that, when the central processing unit 150 detects that the front end of a paper is downstream of the first conveyor roller 116 and the first driven roller 117 by the third paper detection signal from the third paper detector 118, it controls the drive unit 145 to stop the rotation of the paper feed roller 111 and retard roller 112 so that the next paper is not fed. After that, when the central processing unit 150 detects the rear end of the paper downstream of the paper feed roller 111 and the retard roller 112 by the second paper detection signal from the second paper detector 114, it again controls the drive unit 145 to rotate the paper feed roller 111 and retard roller 112 and convey the next paper. Due to this, the central processing unit 150 prevents a plurality of papers from being superposed in the conveyance path. For this reason, the position jam detector 154 may start counting the time at the point of time when the central processing unit 150 controls the drive unit 145 to rotate the paper feed roller 111 and the retard roller 112 and determine that a position jam has occurred when the third paper detector 118 does not detect the front end of a paper within a predetermined time.

Figure 15:
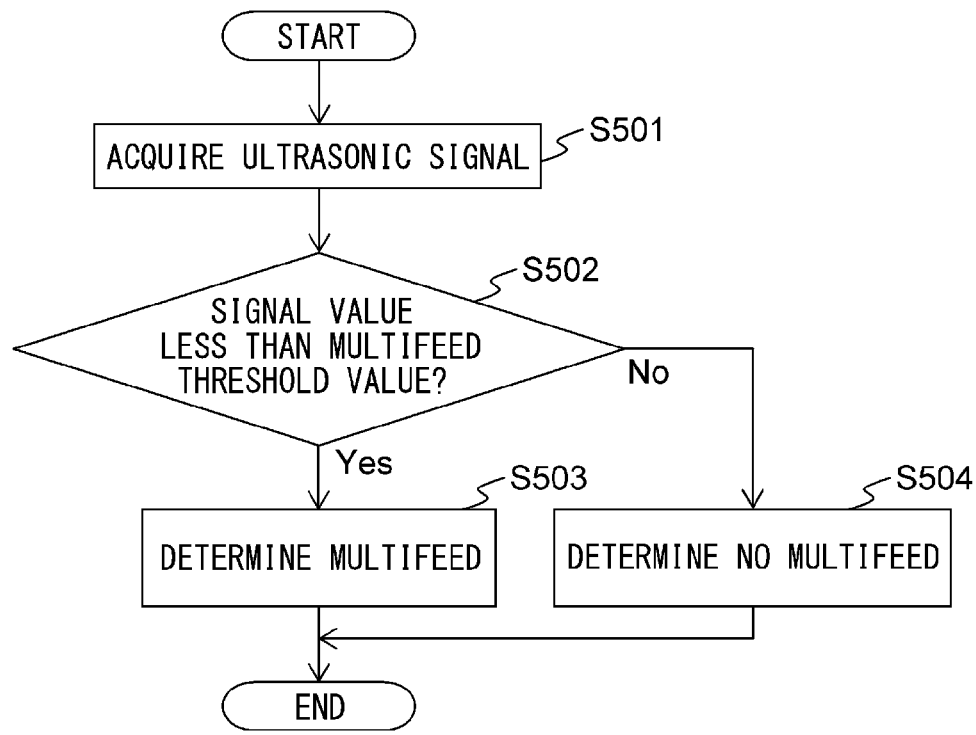
FIG. 15 is a flow chart which shows an example of operation of multifeed detection processing.

FIG. 15 is a flow chart which shows an example of operation of multifeed detection processing.

The flow of operation which is shown in FIG. 15 is executed at step S203 of the flow chart which is shown in FIG. 6.

First, the multifeed detector 155 acquires an ultrasonic signal from the ultrasonic sensor 115 (step S501).

Next, the multifeed detector 155 determines whether the signal value of the acquired ultrasonic signal is less than the multifeed detection threshold value (step S502).

Figure 16:
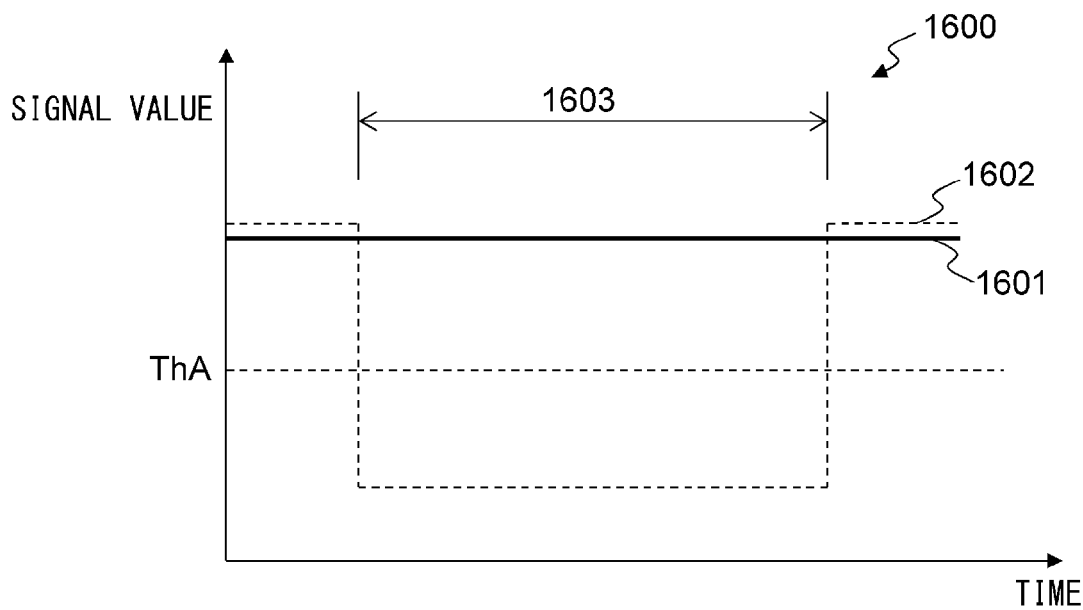
FIG. 16 a view for explaining properties of an ultrasonic signal.

FIG. 16 is a view for explaining properties of an ultrasonic signal.

In the graph 1600 of FIG. 16, the solid line 1601 shows the characteristic of the ultrasonic signal in the case where a single paper is conveyed, while the broken line 1602 shows the characteristic of the ultrasonic signal in the case where multifeed of papers has occurred. The abscissa of the graph 1600 shows the time, while the ordinate shows the signal value of the ultrasonic signal. Due to the occurrence of multifeed, the signal value of the ultrasonic signal of the broken line 1602 falls in the section 1603. For this reason, it is possible to determine whether multifeed of papers has occurred by whether the signal value of the ultrasonic signal is less than the multifeed detection threshold value ThA.

The multifeed detector 155 determines that multifeed of the papers has occurred when the signal value of the ultrasonic signal is less than the multifeed detection threshold value (step S503), determines that multifeed of the papers has not occurred when the signal value of the ultrasonic signal is the multifeed detection threshold value or more (step S504), and ends the series of steps. Note that, when multifeed detection processing is not necessary in the paper conveying apparatus, this may be omitted.

As explained above in detail, the paper conveying apparatus 100 can operate in accordance with the flow charts which are shown in FIG. 5, FIG. 6, and FIG. 8 so as to substantially remove the sound which is generated along with conveyance of a paper, in particular the sound which is generated due to a wrinkle of the paper, based on the difference between the signal which is generated by the sound detected by the first microphone 113a provided at one end of a conveyance path of a paper, and the signal which is generated by the sound detected by the second microphone 113b. Therefore, the paper conveying apparatus 100 can suppress erroneous detection of the occurrence of a jam by sound due to the sound which is generated along with conveyance of a paper.

According to the paper conveying apparatus, the jam detection method, and the computer-readable, non-transitory medium, sound signal generators are provided at the two ends of a conveyance path of a paper and a difference of the sound signals which the sound signal generators generate can be acquired so as to reduce the sound which is generated along with conveyance of the paper, so it is possible to suppress erroneous detection of occurrence of a jam by sound due to the sound which is generated along with conveyance of the paper.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveying apparatus comprising:
   a first sound signal generator for generating a first sound signal corresponding to a sound generated by a paper during conveyance of the paper and including a first sound detector, which is provided at one end of a conveyance path of the paper in a direction which perpendicularly intersects a paper conveyance direction;
   a second sound signal generator for generating a second sound signal corresponding to the sound generated by the paper during conveyance of the paper and including a second sound detector, which is provided at the other end of the conveyance path of the paper in the direction which perpendicularly intersects the paper conveyance direction; and
   a sound jam detector for determining whether a jam has occurred based on a difference of the first sound signal and the second sound signal.

2. The paper conveying apparatus according to claim 1, wherein the sound jam detector generates a third sound signal from which components of sound generated by a wrinkle of a paper are substantially removed based on the difference between the first sound signal and the second sound signal, and determines whether the jam has occurred based on the third sound signal.

3. The paper conveying apparatus according to claim 1, wherein the first sound signal and the second sound signal are signals, the shapes of which are extracted from the signals generated from the sound generated by the paper during conveyance of the paper.

4. The paper conveying apparatus according to claim 1, wherein the first sound signal and the second sound signal are digitized signals of the signals generated from the sound generated by the paper during conveyance of the paper.

5. A jam detection method comprising:
   acquiring a first sound signal from a first sound signal generator for generating the first sound signal, corresponding to a sound generated by a paper during conveyance of the paper, wherein the first sound signal generator includes a first sound detector, which is provided at one end of a conveyance path of the paper in a direction which perpendicularly intersects a paper conveyance direction;
   acquiring a second sound signal from a second sound signal generator for generating the second sound signal, corresponding to the sound generated by the paper during conveyance of the paper, wherein the second sound signal generator includes a second sound detector, which is provided at the other end of the conveyance path of the paper in the direction which perpendicularly intersects the paper conveyance direction; and
   determining, by a computer, whether a jam has occurred based on a difference of the first sound signal and the second sound signal.

6. A computer-readable, non-transitory medium storing a computer program, wherein the computer program causes a computer to execute a process, the process comprising:
   acquiring a first sound signal from a first sound signal generator for generating the first sound signal, corresponding to a sound generated by a paper during conveyance of the paper, wherein the first sound signal generator includes a first sound detector, which is provided at one end of a conveyance path of the paper in a direction which perpendicularly intersects a paper conveyance direction;
   acquiring a second sound signal from a second sound signal generator for generating the second sound signal, corresponding to the sound generated by the paper during conveyance of the paper, wherein the second sound signal generator includes a second sound detector, which is provided at the other end of the conveyance path of the paper in the direction which perpendicularly intersects the paper conveyance direction; and
   determining whether a jam has occurred based on a difference of the first sound signal and the second sound signal.

* * * * *